United States Patent [19]
Van Dest

[11] 3,757,598

[45] Sept. 11, 1973

[54] SINGLE LEVER CONTROL FOR TRANSMISSION

[75] Inventor: Jean Claude Van Dest, Westland, Mich.

[73] Assignee: Massey-Ferguson Inc., Detroit, Mich.

[22] Filed: Sept. 17, 1971

[21] Appl. No.: 181,403

Related U.S. Application Data

[63] Continuation-in-part of Ser. No. 155,051, June 21, 1971, abandoned.

[52] U.S. Cl. ............................................. 74/473 R
[51] Int. Cl. ........................ G05g 9/00, G05g 13/00
[58] Field of Search ................. 74/473 R, 475, 476, 74/477

[56] References Cited
UNITED STATES PATENTS

| | | | |
|---|---|---|---|
| 2,917,941 | 12/1959 | Wittren | 74/475 X |
| 3,365,972 | 1/1968 | Luke et al. | 74/473 X |
| 3,616,709 | 11/1971 | Malm | 74/473 R |

*Primary Examiner*—Milton Kaufman
*Assistant Examiner*—Frank H. McKenzie, Jr.
*Attorney*—John L. Shortley

[57] ABSTRACT

Transmission apparatus including gear shift means having a plurality of forward speed ratio settings and a plurality of reverse speed ratio settings with a single operating lever, the operating lever having a plurality of forward speed ratio settings corresponding to the forward speed settings of the shift means. Actuating means innerconnects the operating lever with the gear shift means for actuating the same to the forward speed settings in response to movement of the operating lever to its corresponding forward speed ratio setting and for actuating the shift means to a reverse speed settings in response to additional movement of the operating lever when the operating lever is in at least some of its forward speed ratio settings. Speed change gear means are operated by the gear shift means to provide a plurality of forward and reverse drive paths between an input shaft and an output shaft, each of the drive paths corresponding to one of the settings of the shift means.

17 Claims, 7 Drawing Figures

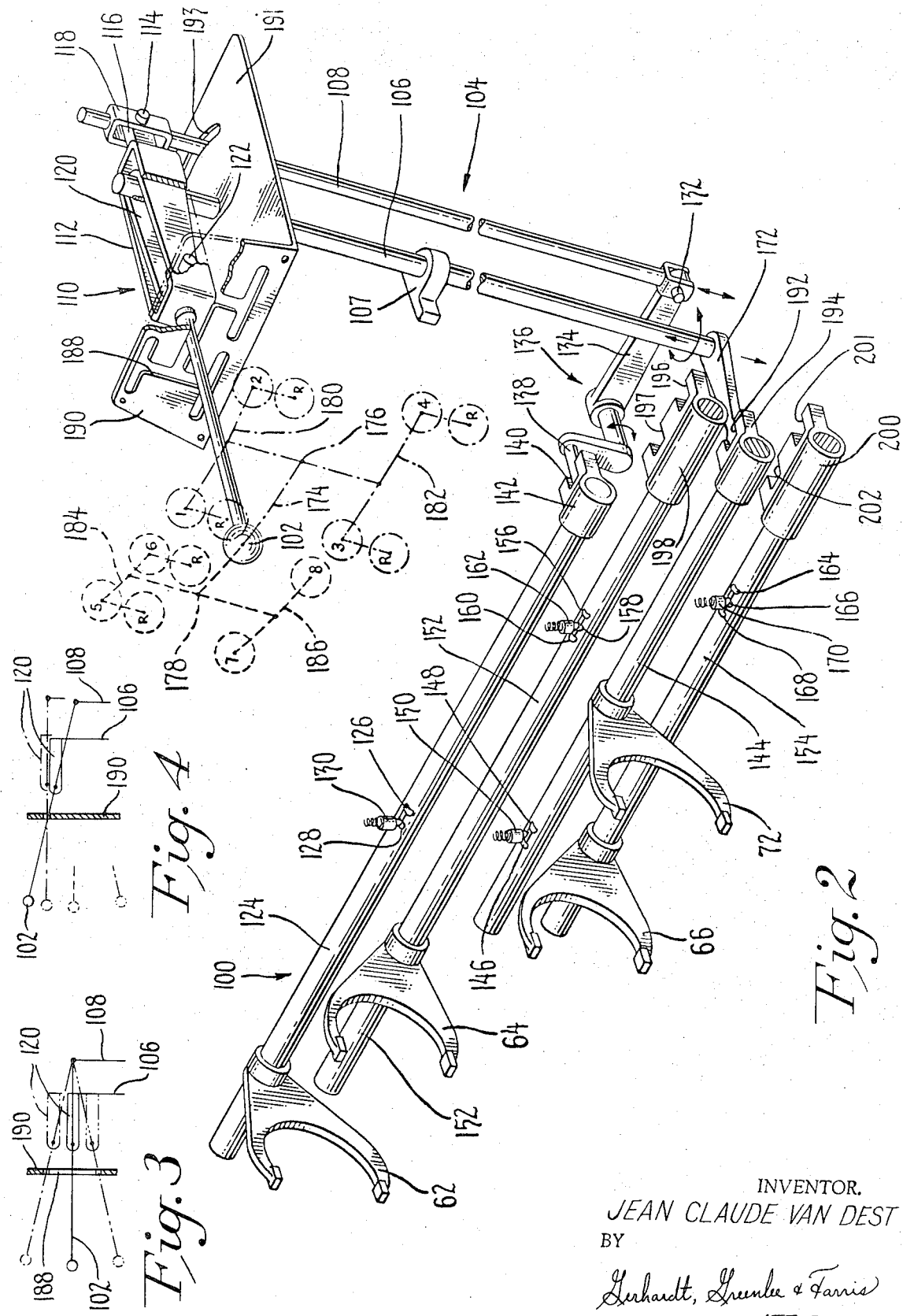

INVENTOR.
JEAN CLAUDE VAN DEST
BY
*Gerhardt, Greenlee & Farris*
ATTORNEYS.

SINGLE LEVER CONTROL FOR TRANSMISSION

This is a continuation-in-part of application Ser. No. 155,051 filed June 21, 1971, now abandoned.

This invention relates generally to multi-speed power transmissions, and is particularly concerned with such transmissions that are suitable for use in tractors and similar vehicles wherein the power plant is driven normally at a constant speed so that the speed of the vehicle is determined by the speed setting of the transmission.

Multiple speed transmissions of the type used in agricultural and industrial tractors usually have at least two speed ranges, up to eight forward speeds in each range and up to four reverse speeds in each range. The range setting, and speed setting are usually made by separate control levers and sometimes the forward, neutral or reverse setting is made by still another control lever. The shifting of up to three levers to obtain a particular speed ratio and direction of travel can be time consuming and it is difficult to determine the exact setting actually made.

It is therefore an object of this invention to provide transmission control apparatus wherein a single lever can be operated to place the transmission in any of its range and forward speed ratio settings and wherein one or more of the forward speed ratio settings can be converted to a corresponding reverse speed ratio setting by manipulation of the operating lever when it is in a particular speed setting corresponding to the speed setting of the transmission.

This and other objects will be readily apparent from the following description and accompanying drawings in which:

FIG. 2 is a perspective view of the control mechanism for the transmission of FIG. 1;

FIG. 3 is a diagram showing the movement of certain elements of the control mechanism of FIG. 2 to change ratios;

FIG. 4 is another diagram showing the movement of certain elements of the control mechanism of FIG. 2 to change direction;

Figure 1:
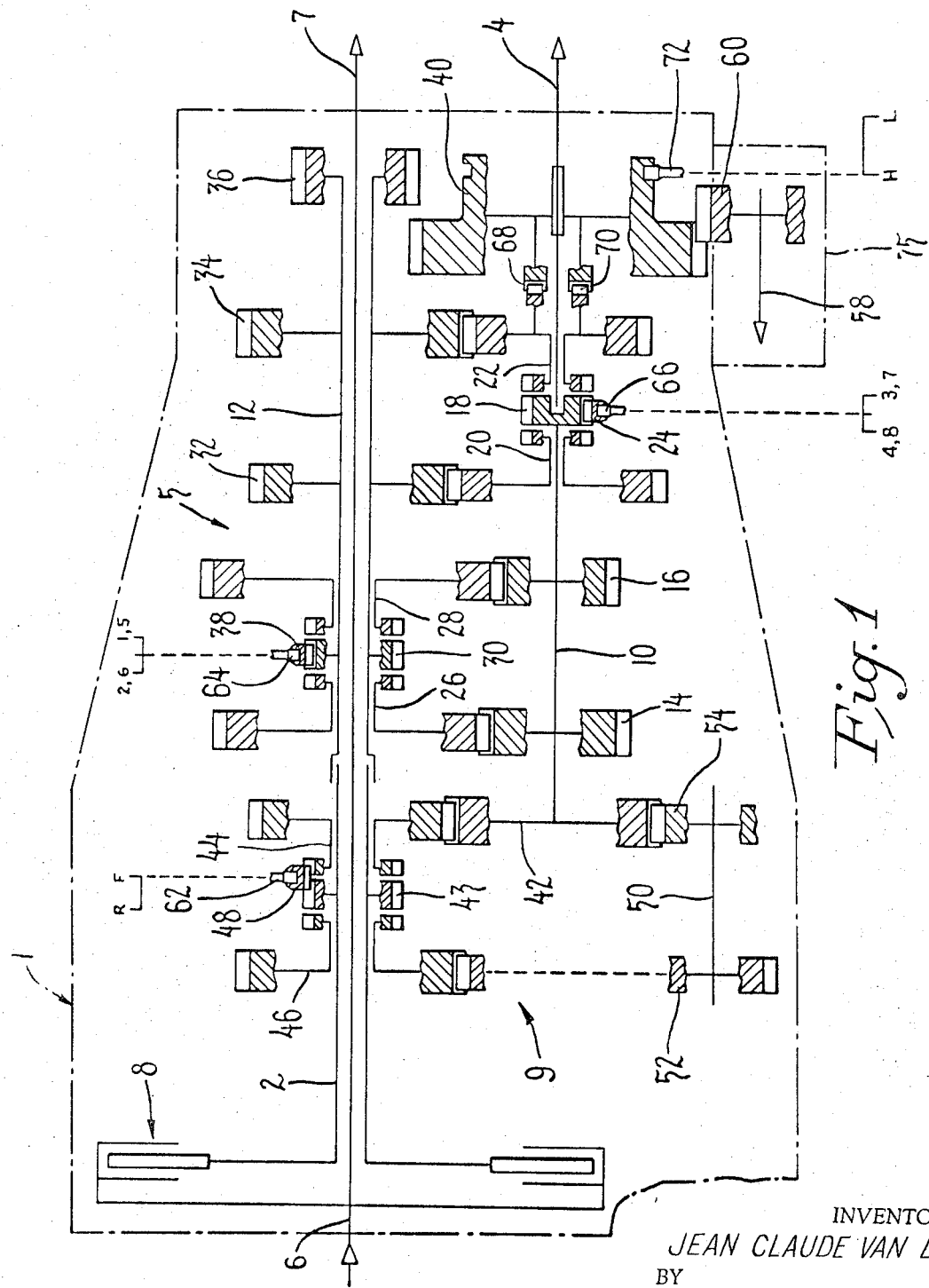
FIG. 1 is a schematic diagram of a transmission embodying the invention.

The transmission apparatus according to the present invention includes gear shifting means such as shift rails having a plurality of forward speed settings and a plurality of reverse speed settings with a single operating lever having a plurality of settings each corresponding to one of the forward speed settings of the gear shifting means. Actuating means innerconnects the operating lever with the gear shifting means for actuating the same to a particular forward speed setting in response to movement of the operating lever to a corresponding setting and for subsequently actuating the gear shifting means to a reverse speed setting in response to further manipulation of the operating lever when the operating lever is in at least some of its forward speed settings.

The actuating means includes a speed ratio control link operable in response to movement of the operating lever to actuate the shift means to its respective forward speed settings and a direction control link operable in response to manipulation of the operating lever to actuate the gear shifting means to a reverse speed setting. The speed control link is movable both axially and rotatably in response to movement of the operating lever to actuate the gear shifting means to its respective speed settings and the direction control link is selectively removable in an axial direction by the operating lever to actuate the gear shifting means to a corresponding reverse speed setting.

The speed ratio control and direction control links are connected with the operating lever by a yoke assembly which is operable to cause rotation of the speed control link upon movement of the operating lever in any selected one of a plurality of spaced parallel planes and, is operable to cause axial movement of the speed control link upon movement of the operating lever between the parallel planes of operation of the operating lever. The yoke assembly further causes axial movement of the direction control link when the operating lever is in a setting permitting actuation of the gear shifting means to a reverse speed setting without movement of the speed control link.

The gear shifting means includes a range control shift rail having a high range position for conditioning the shift means for a high range of speed settings, and a low range position for conditioning the shift means for a low range of speed settings. The shift means also includes a pair of speed ratio control shift rails operable to provide, in combination with the range control shift rail, eight speed settings for the shift means. The shift means also includes a direction control shift rail having forward and reverse positions. When the direction control shift rail is in a reverse position, the shift means is converted to a reverse setting in any of its speed settings. The direction control shift rail is actuated between its forward and reverse positions by movement of the direction control shift link in response to manipulation of the operating lever.

The transmission shown in FIG. 1 is a transmission that has eight forward speeds and up to eight reverse speeds depending on the number of reverse (dash) speeds desired. The transmission includes a forward reverse gear set generally designated 9 and a eight speed ratio changing unit generally designated 5. The transmission input shaft 2 is connected by means of a conventional clutch 8 to a power shaft 6 such as the engine output shaft. The power shaft 6 is connected completely through the transmission as a PTO shaft 7.

The forward (dash) reverse gear unit 9 provides two power paths between the input shaft 2 and an intermediate counter shaft 10. Forward speed is obtained by means of gear 44 which meshes with the input gear 42 of the change speed unit 5 and which is secured to the shaft 10. Reverse gear is provided by gear 46 which meshes with a gear 52 secured to a shaft 50 which has also a gear 54 that meshes with the input gear 42 of the shaft 10.

Reverse and forward can be obtained by a clutching device which includes a splined hub 43 secured to the input shaft 42 and which can be coupled by means of a sliding internally splined clutch element 48 either to the reverse gear 46 or the forward gear 44. The coupler member 48 is moved to the right and left by means of a fork member 62.

The gear unit 5 includes a first pair of gears 14 and 16 secured to the countershaft 10 and which constantly mesh with gears 26 and 28 that are freely rotatable on an intermediate shaft 12. The gears 26 and 28 can be coupled to the shaft 12 for rotation therewith by means of a clutching device including a hub 30 secured to the shaft 12 and a slidable internally splined coupler 38 which can couple the hub 30 alternatively to the gear 26 or the gear 28. The coupler 38 can be moved to the right or left by means of a fork member 64.

A second pair of gears 20 and 22 on the countershaft 10 mesh with a pair of gears 32 and 34 secured to the intermediate shaft 12. A clutching device which includes a hub 18 secured to the countershaft 10 and a slidable internally splined coupler 24 which can connect the hub 18 either to gear 20 or gear 22. The coupler 24 can be moved to the right or left by a fork element 66.

The output shaft 4 of the transmission can be coupled either to gear 36 secured to the intermediate shaft 12 or by means of coupler 68-70 to the gear 22. The gear 40 constitutes a high-low range gear which is slidable by means of a fork member 72. A front wheel drive output gear 60 can be located in the transmission on a suitable shaft to constantly engage the output gear 40 so that the shaft 58 will rotate at the same speed and in the same direction as the output shaft 4. The front wheel drive gear 60 and shaft 58 can be enclosed in a housing 75 shown in dash lines in FIG. 1.

The gear unit 5 as noted above, provides eight speed ratios between the gear 42 and the output shaft 4. Selection of these eight speeds is obtained by movement of the forks 64, 66 and 72. When the gear 40 is shifted to the left into the position shown in FIG. 1, the transmission is conditioned for high range operation. In high range, there are four speed ratios available. These speed ratios can be referred to as fifth, sixth, seventh and eighth speeds. The position of the couplers 38 and 24 required to obtain these speeds are shown in FIG. 1. The lowest of the high range speeds, namely fifth gear is obtained by sliding the coupler 38 to the right to couple the hub 30 to the gear 28 which causes a drive between the countershaft 10 and the intermediate shaft 12 at a relatively low ratio. Drive from the intermediate shaft 12 to the output shaft 4 is then through the gear 34, gear 22 and coupler 68–70 to the output shaft 4. At this time, the coupler 24 is maintained in its intermediate or neutral position by the fork 66.

The next highest gear in high range is sixth gear and this is obtained by shifting the coupler 38 to the left as viewed in FIG. 1 to couple the shaft 12 to gear 26. The drive between intermediate shaft 12 and the output shaft remains through the gears 34, 22 and coupler 68–70.

Seventh speed is obtained by shifting the coupler 38 to the intermediate neutral position shown in FIG. 1 and then shifting the coupler 24 to couple the hub 18 on shaft 10 to the gear 22. This provides a direct drive between the counter shaft 10 and the output shaft 4.

The highest speed ratio obtainable is eighth speed and this is obtained by shifting the coupler 24 to the left coupling gear 20 to the hub 18. The drive in this condition then goes from the countershaft 10 through coupler 24, gear 20, gear 32, gear 34, gear 22 and coupler 68–70. This is an overdrive speed using gears of the diameter shown in the Figure.

When the output shaft gear 40 is moved to the right, as viewed in FIG. 1, it connects the output shaft 4 to the gear 36 secured on the intermediate shaft 12. This provides a low range operation of the transmission in which four speeds are available, namely, first, second, third and fourth in the same manner as the fifth, sixth, seventh and eighth speeds are obtained in the high range operation. Thus, the lowest speed ratio, first, is obtained by coupler 38 being moved to the right to couple the shaft 12 with gear 28 in the same manner as the fifth gear in the high range operation. Similarly, second speed is obtained by shifting the coupler 38 to the left to couple the gear 26 to the shaft 12 in he same manner as sixth gear in high range operation.

Third and fourth speeds are obtained by placing the coupler 38 in its intermediate position and by alternatively moving the coupler 24 to the right to couple gear 22 to hub 18 for third speed and to the left to couple the hub to the gear 20 for fourth speed.

With the transmission shown in FIG. 1, it is possible to have eight forward speeds or eight reverse speeds depending on the position of the clutch coupler 48. Normally it is not desirable to have the top speed ratios such as seventh and eighth speeds in reverse so that suitable lockout means may be provided in the controls for the transmission. Each of the clutch coupler units could be made to include synchronizing elements to synchronize the shifting of the gear changes, such use of synchronizers well known in thee art.

The single lever control of the transmission unit 1 of FIG. 1 is illustrated in FIG. 2 and includes a gear shift means generally indicated by reference numeral 100. An operating lever 102 is connected to the shift means 100 by actuating means, generally designated 104.

The actuating means 104 includes a yoke assembly, generally indicated 110, interconnecting the operating lever 102 with a speed ratio control rod 106 and a direction control rod 108. The axis of the speed control rod 106 is held fixed because the rod 106 passes through spaced apertures in a fixed plate 191 and a fixed guide member 107. The yoke assembly 110 is operable to cause rotation of the speed control rod 106 upon transverse movement of the operating lever in any selected one of a plurality of spaced parallel horizontal planes, and is operable to cause axial or vertical movement of the speed control rod 106 upon vertical or up and down movement of the operating lever between the spaced parallel horizontal planes. As will be described below, the yoke assembly 110 is selectively operable to cause axial movement of the direction control rod 108 when the operating lever 102 is in any of certain speed settings that permit actuation of the shift means to a reverse speed. This axial movement of the direction control rod 108 by the lever 102 can take place without substantial vertical movement of the speed control rod 106.

The yoke assembly 110 includes an outer yoke member 112 that extends between one end of the operating lever 102 and one end of the direction control rod 108. The operating lever 102 is non-rotatably secured to the outer yoke member 112, and the direction control rod 108 is loosely pivoted to the outer yoke member 112 by a pin 114 permitting movement about an axis transverse to the direction control rod 108. An extension 116 on the outer yoke member 112 is received in the legs of a yoke portion 118 formed on the direction control 108, and pin 114 is mounted in portion 118. The yoke assembly 110 further includes an inner yoke member 120 non-rotatably fixed to the speed control rod 106 and which is connected by a pin 122 to the outer yoke member for pivotal movement about an axis spaced from and transverse to the longitudinal axis of the speed control rod 106.

The shift mechanism 100 includes four parallel shift rails. Shift rail 124 has a fork 62 thereon which as shown in FIG. 1 shifts the coupler 48 to provide forward or reverse gear. The shift rail 124 is activated by axial movement of a direction control rod 108 that is pivoted at 132 to a bell crank 136 having an arm 134 and a pin 138 that engages a slot 140 in a lug 142 attached to the shift rails. A detent 130 engages notches 126 or 128 to hold the shift rail in its forward or reverse position. This detent also serves to provide a resistance to movement of the shift rail from either of its two positions.

The speed ratio of the transmission is adjusted by the other three shift rails. As seen in FIG. 2, a shift rail 144 has a fork 72 thereon which as seen in FIG. 1 acts to shift the gear 40 for high or low range operation. The shift rail 144 is activated by rotation of an arm 172 formed on the bottom of the speed ratio control rod 106 and which engages a groove 192 and a lug 194 secured to the shift rail 144. A detent 150 engages notches 146 or 148 to hold the shift rail 144 in its high or low range position. The shift rail 144 as noted above is operated by rotation of the member 172 whenever the axial position of the speed ratio control rod 106 is such that the arm 172 is in line with and engages the slot 192.

The remaining two shift rails 152 and 154 have lugs 198 and 200 formed thereon. These lugs each have two slots, the lug 198 having slots 196 and 197 while the lug 200 has slots 201 and 202. The shift rail 152 carries a fork 64 which shifts the coupler member 38 as seen in FIG. 1 to couple the gear 26 or 28 to the intermediate shaft 12. A three position detent mechanism including the detent 162 and notches 156, 158 and 160 serves to hold the shift rail 152 either in its central neutral position or the two extreme active positions. When the speed ratio control rod 106 is in its highest axial position, the lever 172 will engage either the slot 196 or slot 197 and subsequent rotation of the rod 106 will cause the shift rail 152 to be moved between its operative positions.

The shift rail 154 carries a shift fork 66 which, as seen in FIG. 1, acts to move the coupler element 24 to couple the hub 18 either with the gear 20 or the gear 22. A three position detent mechanism including a detent 170 engaging notches 164, 166 or 168 acts to hold the shift rail 154 in either of its three positions. The rail 154 is shifted when the speed ratio control rod 106 is in its lowered position with the arm 172 engaging either the slot 201 or slot 202 formed in the lug 200 on the shift rail 154.

It will be seen from the above that the operation of the three ratio selecting shift rails is caused by axial and rotational movement of the speed ratio control rod 106. Also, the operation of the forward-reverse shift rail 124 is caused by the axial movement of the direction control rod 108.

Movement of the operating lever 102 is restricted by a plate 190 having a compound slot 188 formed therein. Since the rod 106 has its axis fixed by the apertures in plate 191 and guide 107, transverse or back and forth movement of the lever 102 will cause rotation of the rod 106. At the same time, the rod 108 will move in a curved slot 193 and pivot about the pivot 132. The loose fit of the pin 114 permits the slight angular deflection between the extension 116 on the outer yoke 112 and the yoke 118 formed on the rod 108. The slot 188 in the plate 190 restrict the movement of lever 102 to the pattern shown in dash and dotted lines of FIG. 2. A transverse intermediate path 174 is obtained and the rod 106 is in its intermediate axial position when the arm 172 engages slot 192 in the lug 194. Movement of the lever 102 in this path 174 to the right or left causes the shift rail 144 to move between its high and low range positions.

Position 176 is the low range position and position 178 is the high range position. When the lever 102 is vertically moved up from position 176, it moves into an upper transverse path 180. The movement of the lever 102 at this time is represented in FIG. 3 wherein the yoke and lever assembly pivot about pivot 114 causing the yoke and rod 106 to move upward. The detent 130 on the shift rail 124 provides sufficient resistance to movement of the rod 108 so that the vertical movement of the lever 102 acts solely to raise and lower the speed ratio control rod 106. When the lever is moved up from the position 176, the arm 172 is caused to raise into slot 196 in the lug 198 to engage the upper shift rail 152. If the lever is moved down from the position 176, the arm 172 is moved down to engage the notch 201 in the lower shift rail 154. Similarly, if the operating lever is moved from the position 178 upwards the arm 172 will move into the slot 197 on the upper shift rail and when moved downward from position 178 it will move into the notch 202 in the lower shift rail. When the lever 102 is transversely operated in its upper or lower slots, the arm 172 will cause respectively engaged shift rail 152 or 154 to move back and forth between their operative positions. The position of the shift rails will be obvious from the dotted line pattern shown in FIG. 2, movement in the path 180 causing shifting of the transmission from neutral either to first or second gears, in a path 184 from neutral to fifth or sixth gears, in path 186 from neutral to seventh or eighth gears.

When operating lever 102 is in the positions represented by paths 180, 182, 184 and 186 and the lever is pushed downward as seen in FIG. 2, the lower edges of the slot will act as a fulcrum and downward movement of the lever 102 will cause the direction control rod 108 to be raised acting through linkage 134, 138 to move the shift rail 124 to the left as viewed in FIG. 2 to shift the transmission from forward to reverse.

The pattern shown in FIG. 2 shows a reverse position corresponding to each of the forward speeds 1–6 but does not show corresponding reverse speed for speeds 7 and 8. Shifting into reverse when in the seventh or eighth speed ratios, or any other speed ratio, can be prevented by providing a suitable blocking plate to prevent downward movement of the handle 102 when it is in its path 186.

Figure 5:
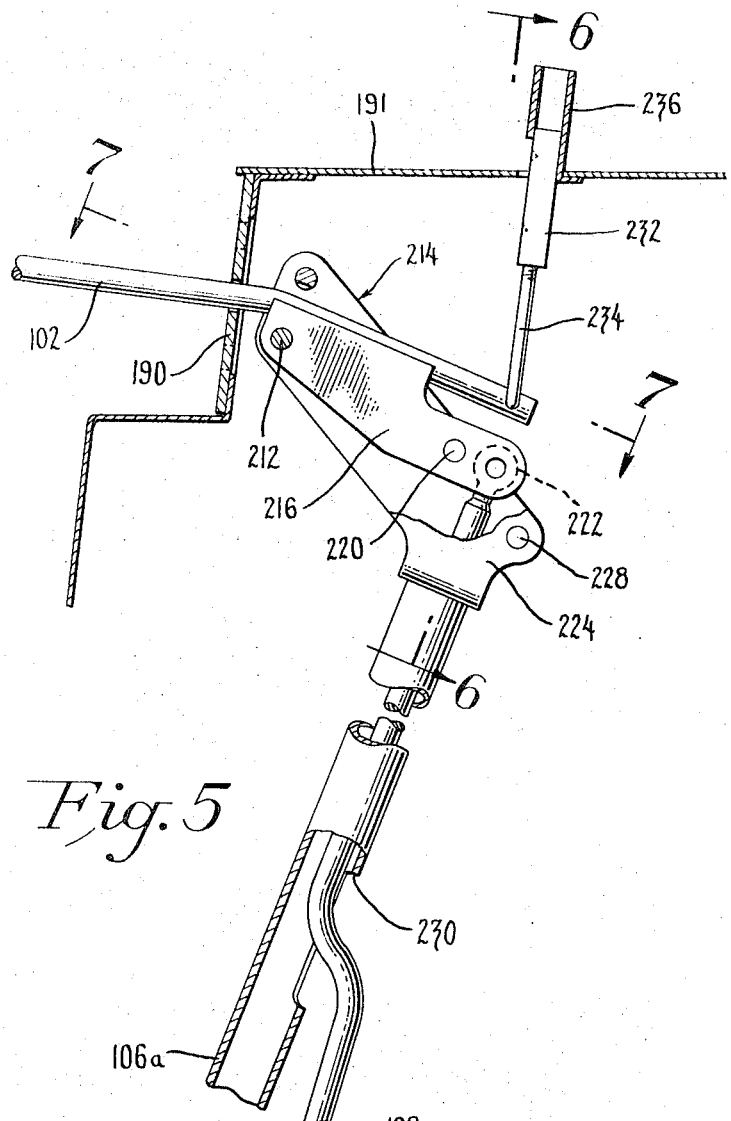
FIG. 5 is a partial elevational view of a modified control mechanism.
Figure 6:
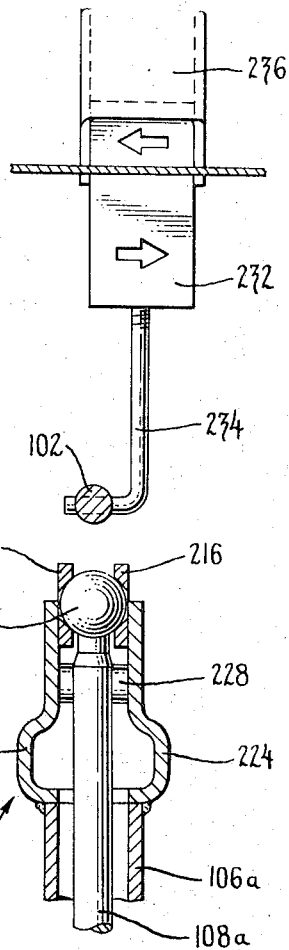
FIG. 6 is a sectional view taken through the line 6—6 of FIG. 5.
Figure 7:
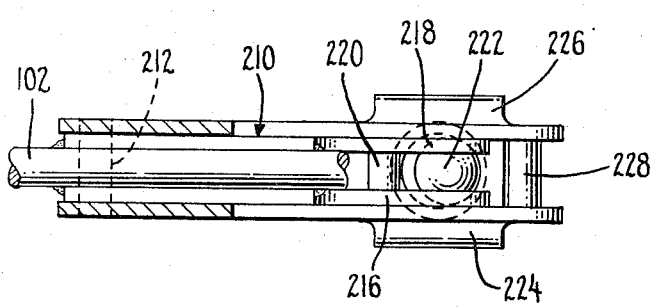
FIG. 7 is a sectional view taken through the line 7—7 of FIG. 5.

As an alternative to the actuating mechanism 110 in FIG. 2, the actuating mechanism shown in FIGS. 5, 6 and 7 can be utilized. In this form the operating lever 102 is secured to an inner yoke member 210 which is pivoted at 212 inside an outer yoke member 214. The inner yoke member 210 is formed of two side plates 216 and 218 which are spaced apart by a pin 220 and embrace a ball 222 formed on the end of the direction control rod 108a which functions the same as rod 108 in FIG. 2. The outer yoke member 214 is also formed by a pair of spaced plates 224 and 226 which are spaced and held together by a pin 228. The outer yoke is secured, as by welding, to the upper end of a tubular rod 106a which corresponds to the speed ratio rod control 106 of FIG. 2. The upper end of the ratio control rod 106a and the direction control rod 108a are concentric and provide for a compact mechanism extending from the actuating mechanism down to the gear shifting mechanism. At the lower portion of the tubular rod 106a the rod 108a is bent and passes through an aperture 230. The lower ends of the rods 108a and 106a are connected to the arms 172 and 134 of the mechanism shown in FIG. 2 in the same manner as that shown in that figure.

Since the operating lever 102 can either be in reverse or forward in each of the operative positions of the shift pattern plate 190, a direction indicator is shown in the embodiment of FIGS. 5, 6 and 7. This includes a visual member 232 connected to the operating lever 102 by a rod 234 and extending through an aperture in plate 191 into a housing 236 attached to that plate. Suitable indicia such as arrows or letters or words may be put on the plate 232 so that the operator may by merely looking at the indicator tell whether he is in forward or reverse without the necessity of moving the lever up or down to insure that it is in its forward or reverse position. The direction indicator could also be used with the actuating mechanism of FIG. 2.

It will be seen that the invention has provided a mechanism whereby a single control lever can be simply actuated to establish eight speeds in the forward direction and any number of corresponding reverse speeds. The invention is not limited to an eight speed transmission nor to the specific embodiments shown in the figures, and other modifications, arrangements and embodiments are deemed to be in the scope of the invention which is limited only by the following claims.

I claim:

1. A multiple speed transmission apparatus providing a finite plurality of speed ratios and a forward and reverse, comprising a first actuating means having a plurality of speed ratio positions for selecting one of said speed ratios, a second actuating means having forward and reverse drive direction positions for selecting the drive direction of said apparatus and control mechanism for operating both said actuating means, said control mechanism comprising a single control lever moveable to a plurality of speed ratio settings and to forward and reverse mode settings characterized by an assembly connecting said single lever with both said first and said second actuating means for moving said first actuating means to said speed ratio positions and for moving said second actuating means between said forward and said reverse drive direction positions while said first actuating means is in one of said speed ratio positions and is connected to said lever by said assembly.

2. The transmission apparatus of claim 1 further characterized in that the first actuating means comprises an axially extending ratio control link operatively connected to the control lever at a point remote from the handle end and arranged at right angles to the same and which is movable axially in response to vertical movement of the control lever and movable rotatably in response to transverse movement of the control lever, and the second actuating means comprises a second axially extending direction control link operatively connected to the control lever and arranged at right angles to the control lever and which is movable axially in response to vertical movement of the control lever.

3. The transmission apparatus of claim 2 further characterized in that the ratio control link and the direction control link are operatively connected to the control lever by said assembly having a first means secured at one end to the control lever and at the other end pivotally connected to the direction control link to move about an axis and having a second means pivoted at one end to the first means at a point intermediate the lever end and the other end of the first means, the second means being secured at the other end to the ratio control link, the means are arranged so that back and forth movement of the control lever and first means will cause back and forth movement of the second means and rotation of the ratio control link while up and down movement of the control lever tends to axially move both said ratio control and said direction control links up and down in axial extending directions.

4. The transmission apparatus of claim 3 further characterized in that detent means are provided to resist axial movement of the direction control link so that up and down movement of the control lever will cause up and down axial movement only of the ratio control link to effect a change in speed ratio, and positive stop means are provided at a point on the control lever intermediate the one end and the pivotal connection between the second member and the direction control link to limit up and down movement of the control lever at that point so that up and down movement of the control lever will cause up and down movement of the direction control link to effect a change in direction 5. The transmission apparatus of claim 4 further characterized in that a positive stop means comprises a guide means for the control lever in the form of a fixed plate having a series of parallel transverse slots through which the control lever extends, the slots permitting back and forth transverse movement of the control lever to effect certain changes in the speed ratio, the sides of the slots acting to limit vertical movement of the control lever at the point of contact with the sides of the slots to thereby cause up and down movement of the direction changing link as the control lever is moved up and down.

6. The transmission apparatus of claim 5 further characterized in that the plate also has a second set plurality of vertically extending parallel slots connecting the first set of transverse slots and which permit vertical movement of the control lever whereby up and down movement of the control lever handle will cause vertical movement of the ratio control link but not the direction control link the movement of which is resisted by the detent means.

7. The transmission apparatus of claim 2 further characterized in that one of the axial extending links is hollow and the other axial extending links extends through at least a portion of the hollow link and is coaxial therewith.

8. The transmission apparatus of claim 2 further characterized in that the axial extending ratio and direction control links are arranged in a spaced parallel manner.

9. The transmission apparatus of claim 2 characterized in that direction indicator means is provided to indicate the position of the direction setting linkage and consequently the direction condition of the drive trains.

10. The transmission apparatus of claim 1 further characterized by means for releasibly holding either of said actuating means in a given setting, said first and second actuating means pivotally connected to said assembly at spaced points and fulcrum means for preventing movement of said first actuating means on movement of said second actuating means by said single control lever between the forward and reverse settings.

11. The transmission apparatus of claim 1 further characterized by said first and second actuating means being pivotally connected to said assembly at spaced points and fulcrum at the pivotal connection of said first actuating means for preventing movement of said first actuating means on movement by said single control lever of said second actuating means between the forward and reverse settings.

12. The transmission apparatus of claim 1 further characterized by said first actuating means having an axially extending ratio control link operatively connected to the control lever by said assembly and which link is moveable axially and rotatably by the control lever and said second actuating means having a second axially extending direction control link operatively connected to the control lever by said assembly and which link is moveable axially in response to movement of the control lever.

13. The transmission apparatus of claim 1 characterized by guide means being provided to guide the control lever between its speed ratios.

14. A transmission apparatus of claim 1 characterized by said assembly having a first yoke member connecting the first actuating means thereto and a second yoke member connecting the second actuating means thereto.

15. The transmission apparatus of claim 1 further characterized by said assembly having a first yoke member and a second yoke, said second yoke member is secured at one end to said control lever and pivotally connected at the other end to said second actuating means, said first yoke member is pivoted to said second yoke member at a point remotely spaced from the pivotal connection of the second actuating means and adjacent the connection of said control lever.

16. A multiple speed transmission including a plurality of gear trains providing a plurality of forward speed ratios and a plurality of reverse speed ratios, selectively operable gear shift means for conditioning the gear trains to obtain the various speed ratio including at least two ratio setting shift rails movable between two ratio positions for selecting the speed ratio and a third direction setting shift rail for selecting the speed direction; control mechanism for selectively operating said shift rails including a first speed ratio setting elongated link movable up and down between two positions for selectively engaging one or the other of the ratio setting shift rails and rotatable about its longitudinal axis to shift the engaged ratio setting shift rail, a second direction setting elongated link connected to said third shift rail in a manner that up and down movement of, the second link wil shift the direction setting shift rail between forward and reverse positions, a control lever, a yoke assembly interconnecting the first and second links whereby back and forth transverse movement of the control lever will effect rotation of the first link and up and down movement of the control lever will tend to vertically move both of said links up and down, means for resisting up and down movement of said second link and slotted plate means through which the control lever extends and which permits free movement of the control lever up and down to effect up and down movement of, the first link to engage one or the other shift rail and permits transverse movement of the control lever to effect rotational movement of the first link to shift the engaged shift rail but which resists movement of the control lever when the same is in a transverse ratio establishing position corresponding to either of the two ratio positions of the ratio setting shift rails, vertical movement of the control lever when in such transverse ratio establishing position causing vertical movement of the second direction setting link to shift the direction setting shift rail.

17. The transmission apparatus of claim 1 wherein a third ratio setting shift rail is provided to condition the gear trains between two ranges and wherein the first link engages the third ratio shift rail when in an intermediate position between engagement of the other two ratio setting shift rails and rotational movement of the first link acts to shift the third ratio shift rail.

* * * * *